Oct. 29, 1968 J. S. PILCH 3,407,946
CONTROL MECHANISM FOR BACKHOE
Filed March 4, 1966 8 Sheets-Sheet 1
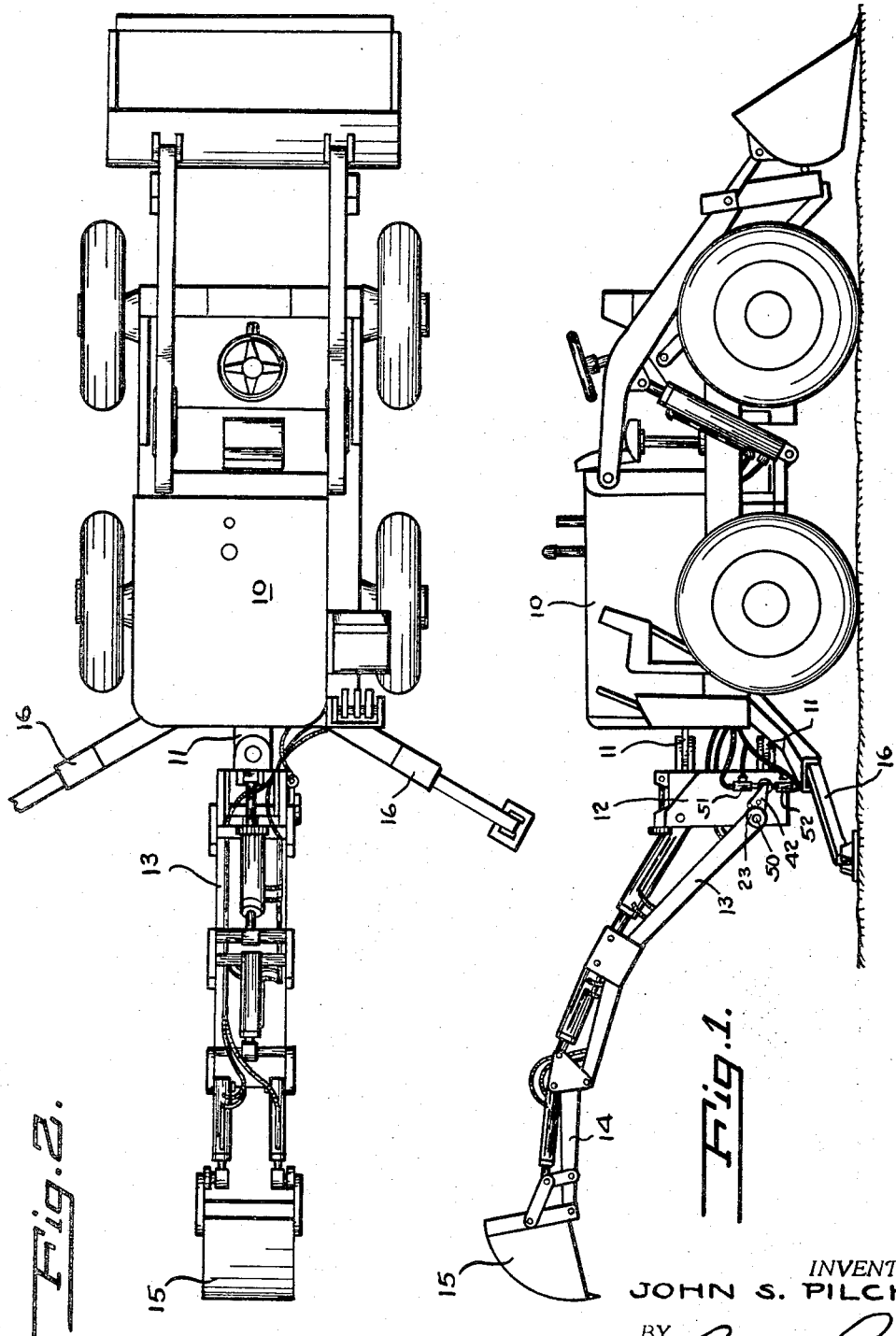
INVENTOR.
JOHN S. PILCH
BY
*Raymond A. Paquin*
ATTORNEY.

Oct. 29, 1968 J. S. PILCH 3,407,946
CONTROL MECHANISM FOR BACKHOE
Filed March 4, 1966 8 Sheets-Sheet 2

INVENTOR.
JOHN S. PILCH
BY
Raymond A. Paquin
ATTORNEY.

Oct. 29, 1968  J. S. PILCH  3,407,946
CONTROL MECHANISM FOR BACKHOE

Filed March 4, 1966  8 Sheets-Sheet 3

INVENTOR.
JOHN S. PILCH
BY
ATTORNEY.

Oct. 29, 1968  J. S. PILCH  3,407,946
CONTROL MECHANISM FOR BACKHOE
Filed March 4, 1966  8 Sheets-Sheet 5

INVENTOR.
JOHN S. PILCH
BY
Raymond A. Paquin
ATTORNEY.

Oct. 29, 1968          J. S. PILCH          3,407,946
CONTROL MECHANISM FOR BACKHOE
Filed March 4, 1966                    8 Sheets-Sheet 6

INVENTOR.
JOHN S. PILCH
BY
*Raymond A. Fargueen*
ATTORNEY.

Oct. 29, 1968 J. S. PILCH 3,407,946
CONTROL MECHANISM FOR BACKHOE
Filed March 4, 1966 8 Sheets-Sheet 7

INVENTOR.
JOHN S. PILCH
BY
ATTORNEY.

Oct. 29, 1968   J. S. PILCH   3,407,946
CONTROL MECHANISM FOR BACKHOE
Filed March 4, 1966   8 Sheets-Sheet 8
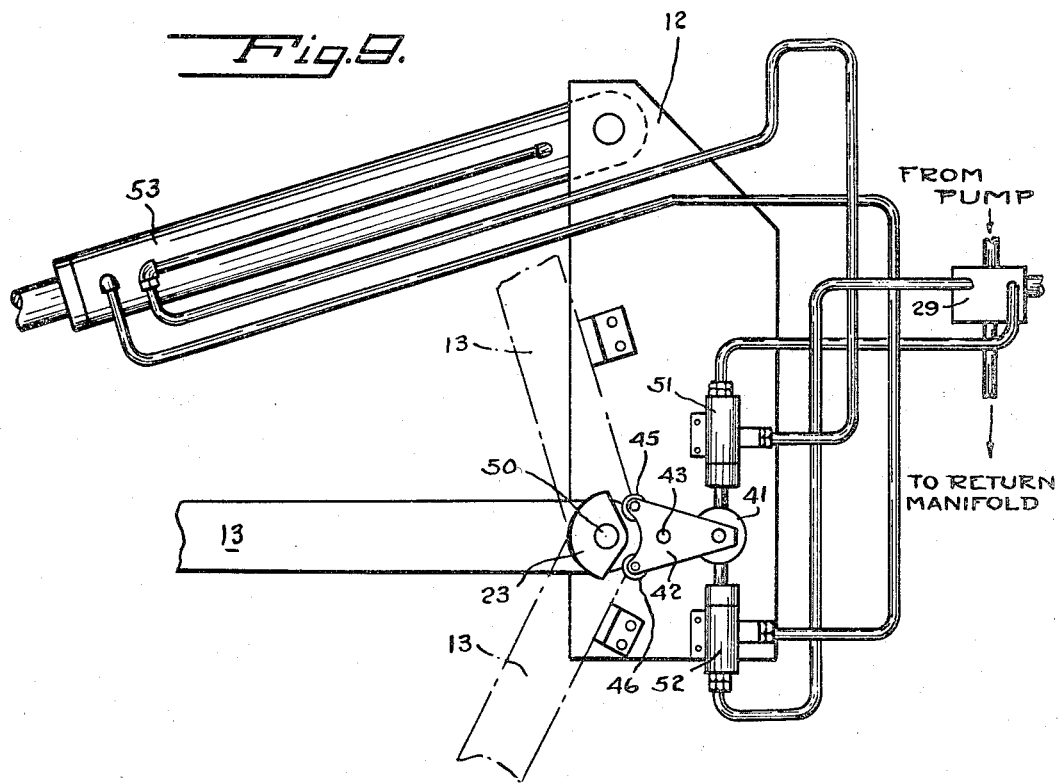
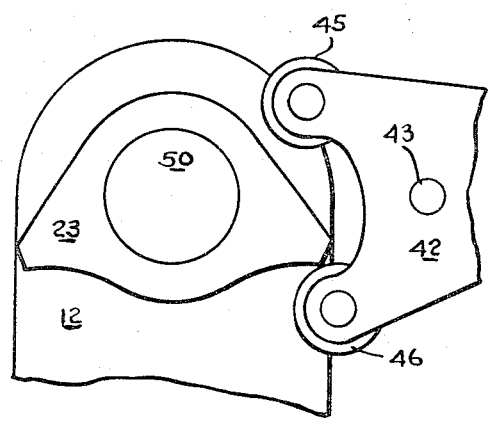
INVENTOR.
JOHN S. PILCH
BY
Raymond A. Paquin
ATTORNEY.

United States Patent Office 3,407,946
Patented Oct. 29, 1968

3,407,946
CONTROL MECHANISM FOR BACKHOE
John S. Pilch, Ware, Mass., assignor to Ware Machine Works, Inc., Ware, Mass., a corporation of Massachusetts
Filed Mar. 4, 1966, Ser. No. 531,822
10 Claims. (Cl. 214—138)

ABSTRACT OF THE DISCLOSURE

A mechanism for non-terminatingly controlling the swing or rotation of a movable member, such as the boom-carrying turret of a backhoe. The mechanism is illustratively a valve that has a throttling effect in a hydraulic system by which the movable member is powered. As such, the throtting valve is in a line that carries either actuating fluid to an operating jack, or return fluid from a non-operating jack. As the movable member swings to a preassigned position, it activates the throttling valve in the direction of fluid flow and constricts the flow to provide a cushioning effect. In an illustrative embodiment, the valve includes an interior plunger that is slidable in the direction of fluid flow and has two ports. One port is always open, so that fluid flow cannot be completely terminated, but the other is closable by sliding the valve, so that the flow can be curtailed, thus cushioning the rotation of the movable member. To achieve rapid response, an exposed end of the slidable valve is actuated by a pivoted lever that is in turn controlled by a cam on the movable member.

---

This invention relates to swing control mechanism and has particular reference to new and improved means for automatically reducing the speed of swing or pivotal movement of a member throughout a predetermined portion of its pivotal movement while allowing full range pivotal movement thereof under power.

In many apparatuses having members pivoted under power, for example, the swinging or horizontal pivotal movement of a boom carrying turret of a backhoe, and the vertical pivotal movement of the backhoe boom on the turret or on the pivot connection of a dump truck body, it has long been considered desirable by me to provide means for automatically changing or slowing down or cushioning the swing pivoted member near the end of its pivotal motion in order to prevent damage or injury to the apparatus upon the stopping of such pivotal motion by mechanical stop means at the end or limit of its pivotal stroke which would eventually cause mechanical and hydraulic failures. While I have been especially interested in the use of this feature in backhoes, it also is applicable to many other applications.

Such arrangements are shown in my application Ser. No. 825,688, filed July 8, 1959 (now abandoned) and application Ser. No. 855,939, filed Nov. 27, 1959 (also abandoned).

Also application Ser. No. 47,233, filed Aug. 3, 1960 (now abandoned), application Ser. No. 47,234, filed Aug. 3, 1960 (now abandoned) and Patent No. 2,991,759, filed May 17, 1960 and granted July 11, 1961.

In my application Ser. No. 285,499, filed June 4, 1963, I have shown an arrangement wherein a cushioning action was provided without closing down the flow of fluid that is utilized in rotating the boom but only restricts and closes off the flow of the escaping or scavenger oil from the cylinder from which the ram is being extended.

Up to now, all backhoes were designed so as the unit is being rotated and nears the end of its swing, the operator had to manually actuate the control valve or in other words, partially close it off so as to throttle the speed of swing or travel before the unit came in contact with the mechanical stop at the base. If the operator did not throttle the speed of swing at the proper time, the machine would reach the end of its swing or travel at a high rate of speed and would pound on the mechanical stops eventually causing mechanical and hydraulic failures.

All of the arrangements of my applications listed above did cushion the stop of pivotal movement but had a serious drawback in that they did not have any means for automatically allowing continuance of pivotal movement under power during the predetermined portion of the swing through which it moves at changed or reduced speed, which feature is the principal object of the present invention.

Other objects and advantages of this invention are the following:

A backhoe or trencher of which the operator has full control at all times to hydraulically rotate the turret and boom structure through the full arc of swing or rotation the particular machine is designed to rotate and through a portion of this rotation and/or movement, the operator through the manual controls can rotate the unit at a high speed or in other words at the full speed the machine was designed to operate at and during a portion of its said swing is automatically slowed down and yet will continue to travel through that portion of swing that is slowed down at a decelerated pace under hydraulic power and will continue its swing or movement until the mechanism comes in contact with the mechanical stops, but because the rate of swing or travel has been automatically slowed down, the danger of structural failures is minimized.

It is also pointed out that this invention can be used for other hydraulic applications, wherever a hydraulic circuit is raising or lowering or actuating any piece of equipment. By utilizing the invention, the speed of this actuation is slowed down yet is continued under power at a slower rate of speed.

An automatically operated valve that will slow the speed of swing or any movement of a hydraulic cylinder even though the operator is holding the manual control valve in full speed position, and yet allows the unit to complete its movement through the full arc of swing under power at a slower pace.

An automatically operated valve that will slow the speed of swing or movement through any required portion of this movement.

An automatically operated valve that will slow the speed of swing or movement through any required portion of this movement. It will be understood that this valve will automatically slow the speed down in any particular required portion of this movement depending on the shape of the cam. Through the use of specially shaped cams the speed of swing can be slowed down and then the cam will open the valve and increase swing speed again if so desired.

Referring to the drawings:

FIG. 1 is a side view of a tractor mounted backhoe embodying the invention;

FIG. 2 is a top or plan view of the apparatus shown in FIG. 1;

FIG. 9 is a partial side view, generally similar to FIG. 1, but on an enlarged scale; and FIG. 10 is a view showing a modified form of cam that may be employed in the form of the invention illustrated.

Figure 3:
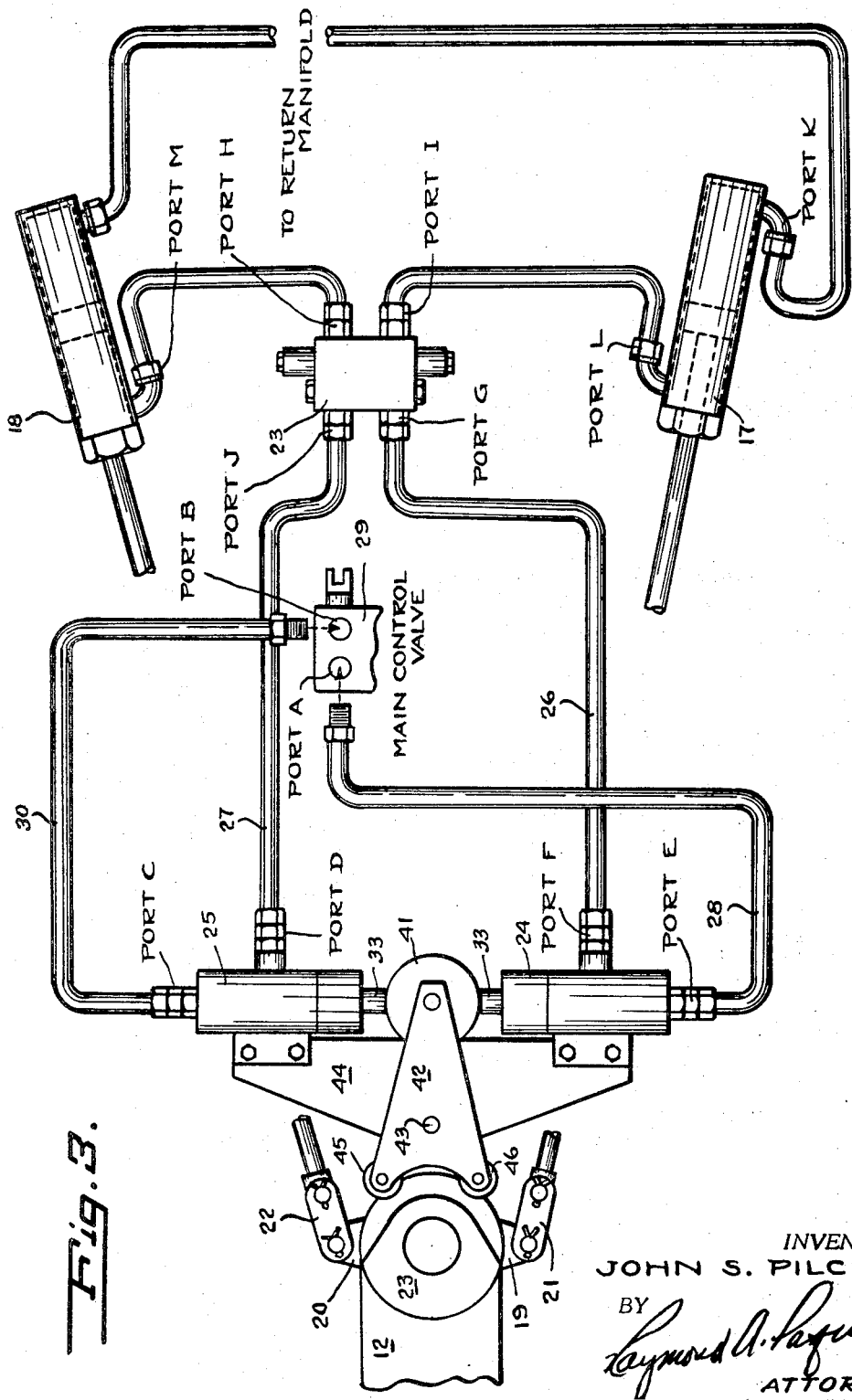
FIG. 3 is a schematic view showing a hydraulically actuated system embodying the invention.

Referring more particularly to the drawings wherein similar reference characters designate corresponding parts throughout, the tractor mounted backhoe shown in FIGS. 1, 2, and 9, embodying the invention, comprises the tractor 10 having the pivots 11 for the turret 12 which carries the boom 13 on the end of which is pivotally connected dipper stick 14 which in turn carries bucket 15.

The tractor is provided with the ground engaging stabilizers 16.

The turret 12 is adapted to be pivoted, about a vertical axis, on pivots 11 by means of double acting hydraulic jacks 17 and 18 (FIG. 3) which are connected to lugs 19 and 20 respectively through links 21 and 22 respectively for effecting pivotal movement of turret 12 for pivoting the turret and boom 13 about pivots 11.

The cam 23 is carried by turret 12 and pivotable therewith.

The hydraulic system includes the swing relief valve 23 connected to the forward sides of hydraulic jacks 17 and 18 and which valve is connected to swing throttling valves 24 and 25 by hydraulic lines 26 and 27 respectively.

Swing throttling valve 24 is connected by hydraulic line 28 to main control valve 29, swing throttling valve 25 is connected by hydraulic line 30 to said main control valve 29.

Figure 8:
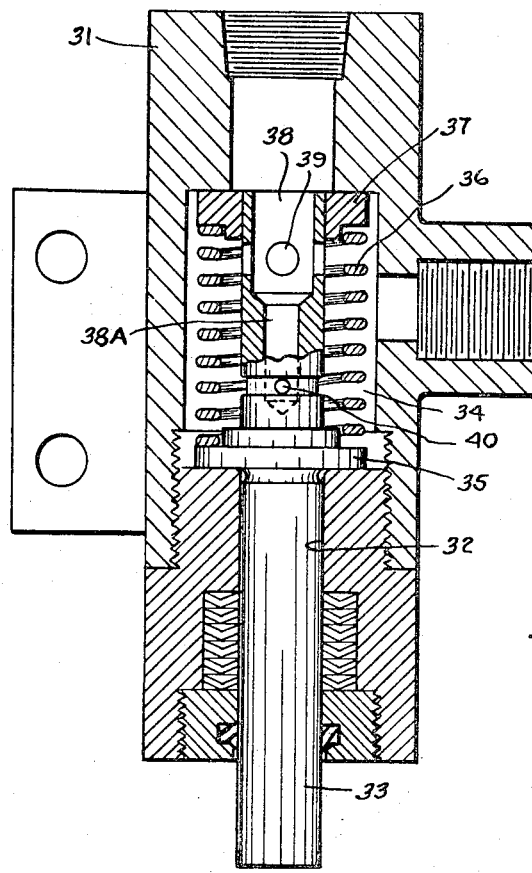
FIG. 8 is a sectional view of the swing throttling valve shown in FIGS. 3, 5, 6 and 7.

Each of the swing throttling valves 24 and 25 comprises a housing 31 (FIG. 8) having a longitudinal bore 32 in which is positioned a plunger 33 which extends into a spring chamber 34 intermediate the ends of bore 32 and which plunger is provided with spring seat 35 in said spring chamber 34. Spring 36 has one end engaging said spring seat 35 and its opposite end engaging poppet 37 slidably mounted on said plunger 33.

The cam 23 carried by turret 12, as previously described, is adapted to be pivoted throughout the full range of pivotal movement of the turret which is approximately 185 degrees.

Figure 5:
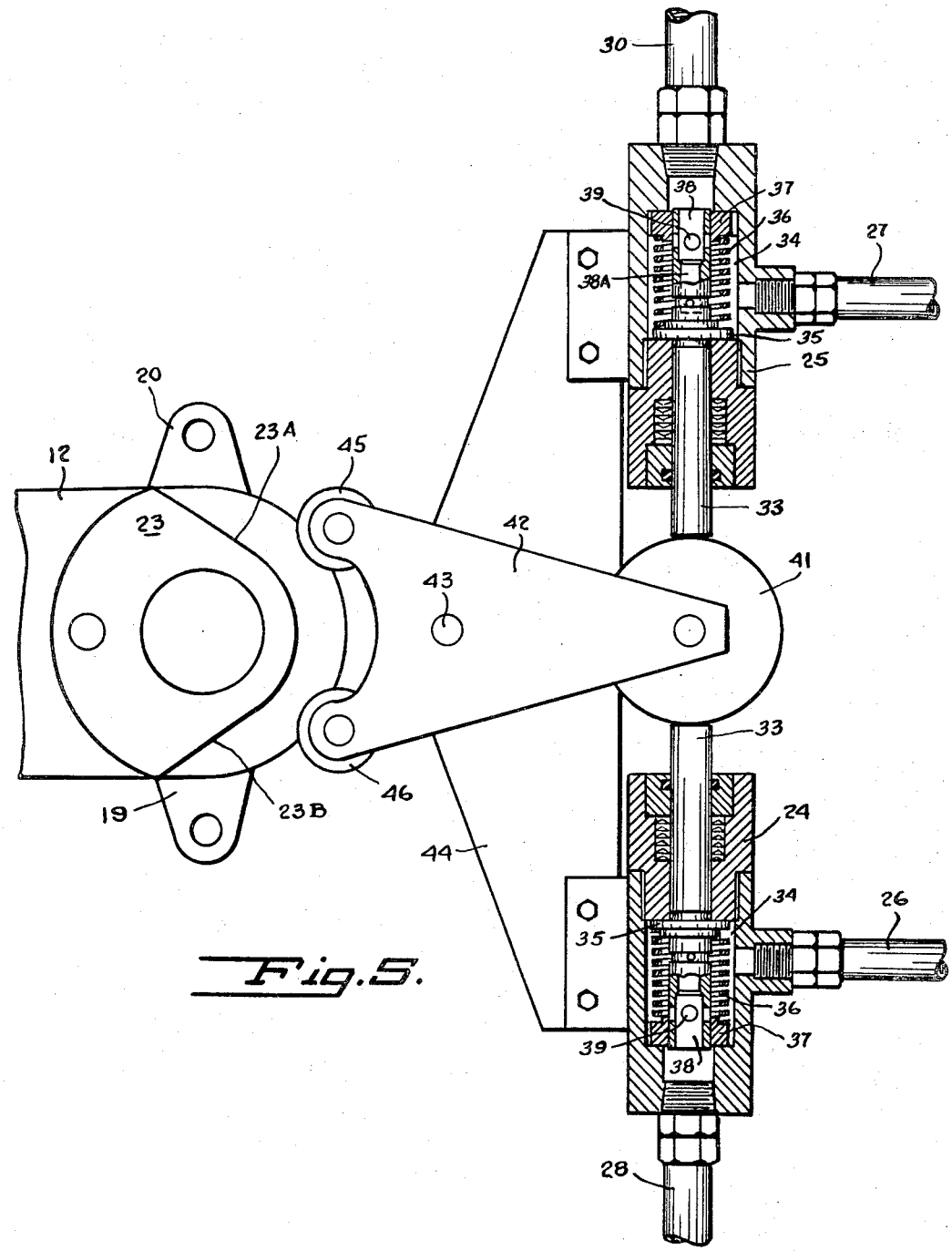
FIG. 5 is a fragmentary view of the arrangement shown in FIG. 3, on an enlarged scale, and showing the actuating mechanism in neutral position.

The system shown in FIG. 3 is provided with opposed swing throttling valves between the plungers 33 of which is positioned the roller 41 of cam follower 42 which is pivotally mounted at 43 on bracket 44 and cam follower 42 has the rollers 45 and 46 adapted to be engaged by the respective cams 23a and 23b on cam 23 depending upon the direction of pivotal movement of turret 12. In FIGS. 3 and 5, the turret 12 is shown at its center position at which time the cam 23 does not engage the followers 45 or 46.

Figure 6:
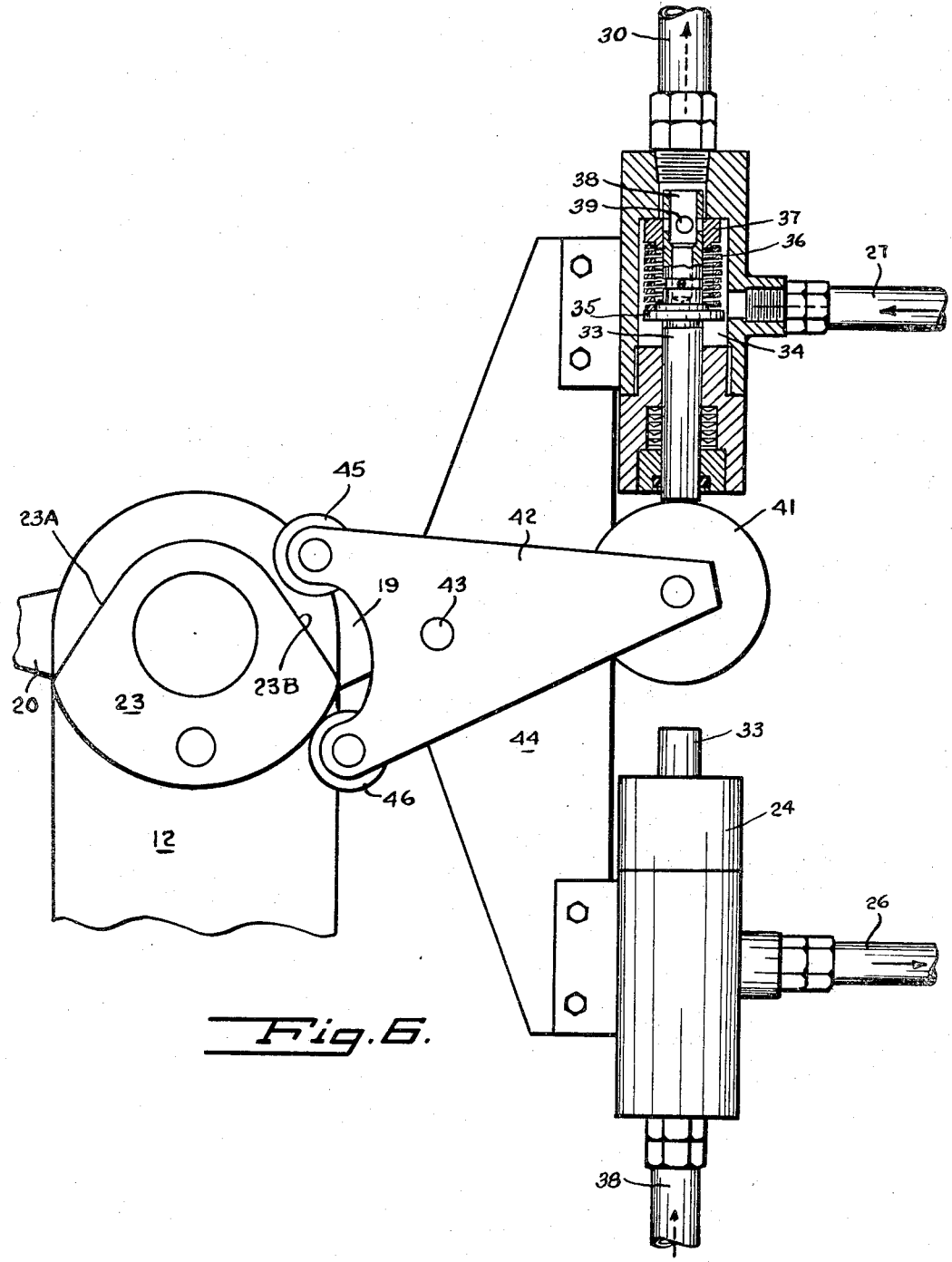
FIGS. 6 and 7 are views generally similar to FIG. 5, but illustrating the operation of the invention.

When the turret 12 and cam is pivoted in one direction, as shown in FIG. 6, the cam 23 engages roller 46 and pivots follower 42 on its pivot 43 to depress plunger 33 and restrict fluid passage of fluid from the forward end of cylinder 25 to the control valve 29. This passage is normally open because large ports 39 and larger duct 38 in plunger 33 allow substantially unrestricted passage from line 27 to line 30 which communicates with main control valve 29.

When plunger 33 is depressed as shown in FIG. 6, passage through ports 39 is closed off and fluid must pass through smaller ports 40 and smaller axial passage 38A (FIG. 5), thus the passage of such fluid is substantially restricted which substantially reduces the speed of pivotal movement of the turret 12 and boom but due to the restricted passage 40 allows continued pivotal operation under power at such reduced speed.

The predetermined portion of the pivotal swing during which such slower speed operation under power is possible can be controlled by controlling the contour of cam 23 and by merely changing the cam, this range can be changed accordingly.

Figure 4:
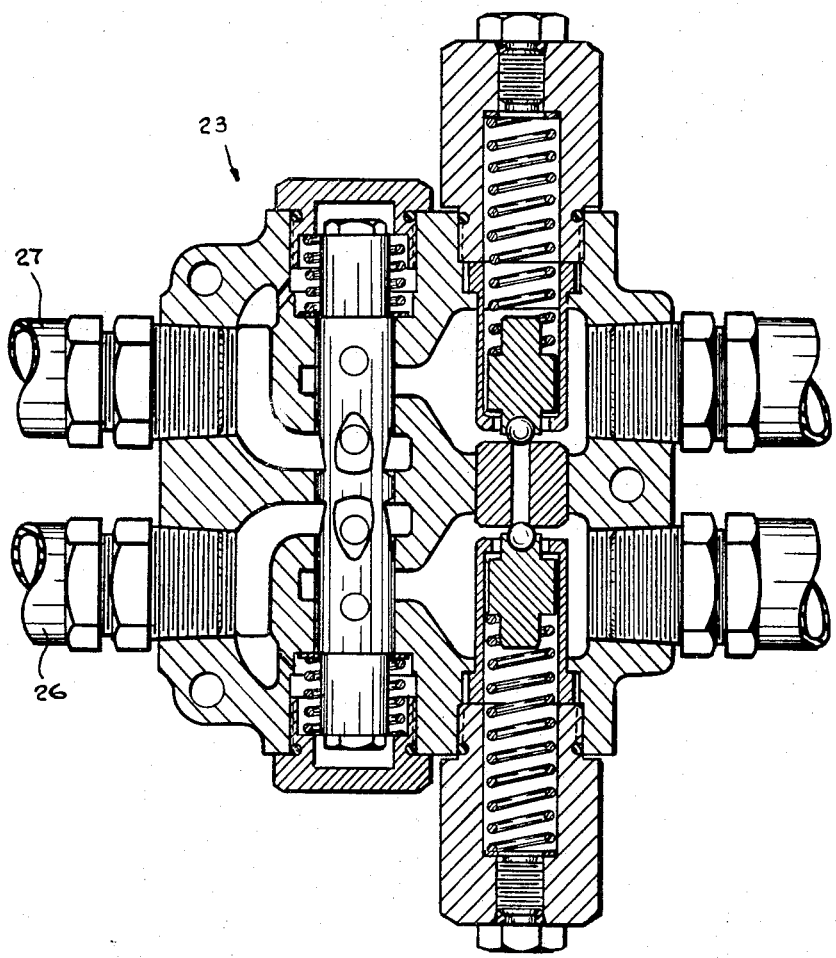
FIG. 4 is a sectional view of the swing relief valve embodied in the arrangement of FIG. 3.
Figure 7:
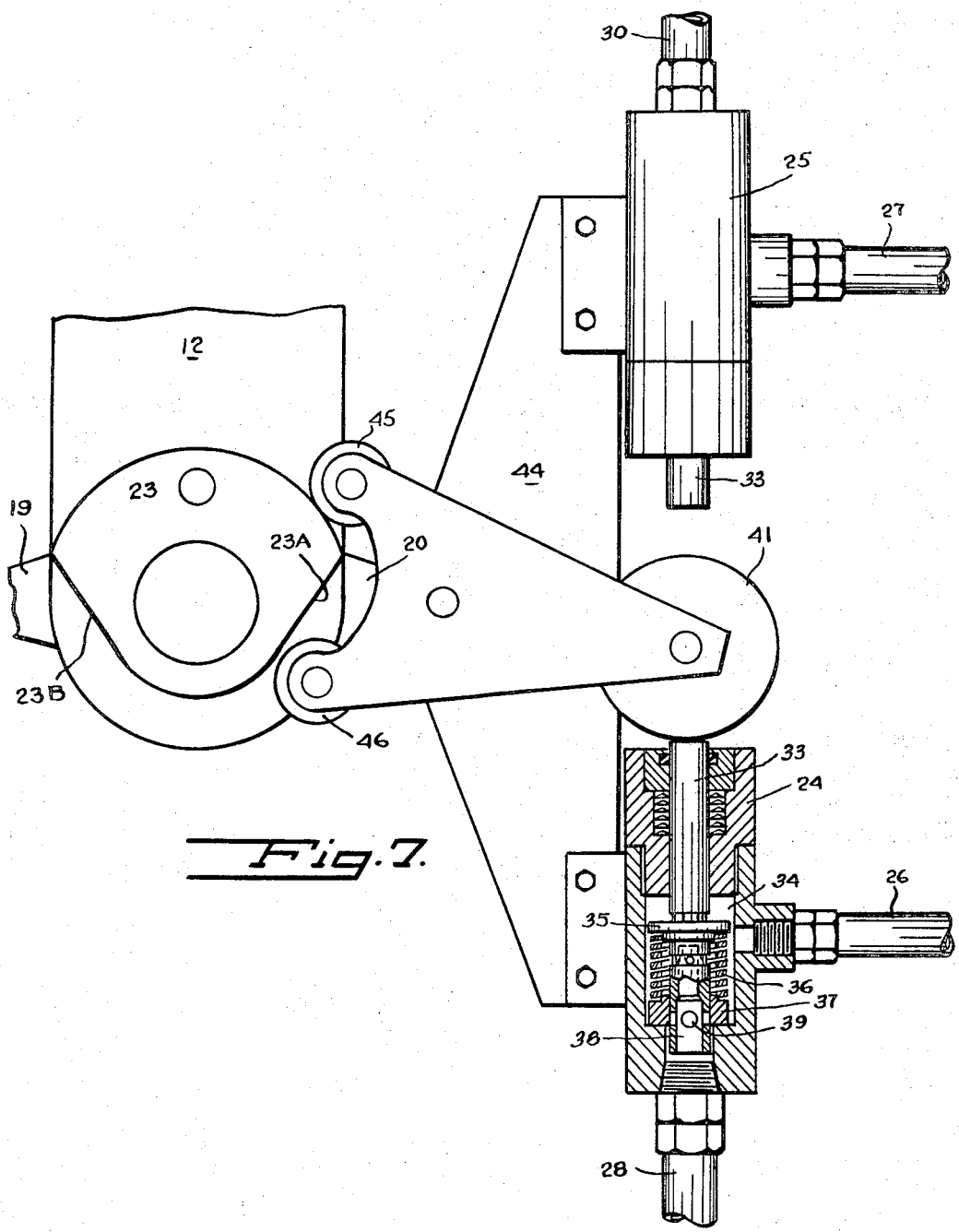

In FIG. 7, the turret 12 and cam 23 is shown pivoted in the opposite direction from that shown in FIGS. 4 and 6 but the operation is the same and is believed clear from the foregoing description.

In this invention, if the control valve is actuated to swing or pivot the turret and boom, the turret and boom will pivot at full speed until the cam follower actuates plunger 33, at which time speed of pivoting will be reduced but the pivotal movement will continue at such reduced speed but under power until the control valve is released or the turret reaches the end of its pivotal stroke. Due to the reduced speed of pivotal motion damage to the apparatus will be eliminated.

It will be understood that by controlling the area of ports 40 and axial duct 38A that practically any desired reduction of speed can be obtained.

In FIGS. 1 and 9, the invention is shown applied to the boom lift and lowering arrangement for the boom of a hydraulic trencher or backhoe. In this application of the invention the boom 13 is pivotally mounted on turret 12 at 50 and cam 23 is mounted on the pivot for the boom and is adapted to pivot therewith.

Cam follower 42 is pivotally mounted by pivot 43 on turret 12 and swing throttling valves 51 and 52 are positioned above and below cam follower roller 41 and are adapted to control fluid flow from boom lift cylinder 53 in the manner previously described.

The cam 23 in the form shown in FIG. 10 is a modified form in that with the dwells between the cam lobes, there is illustrated an arrangement which allows the obtaining of automatically slowing down the pivotal movement at various times during the movement followed by actuation or movement at normal speeds.

The operation of the device (FIG. 3) is as follows:

As the operator actuates the manual control valve 29, oil supplied by the pump under pressure will flow through port A through throttling valve 24. The oil has free access to flow through said valve 24, as it is not actuated at this time, through port F into port G through the swing relief valve 23 and continues on into port L of swing cylinder 17. This oil now flows into cylinder 17 causing the cylinder to retract and rotate the turret member 12 in the direction shown in FIG. 6. This is all done under hydraulic power supplied by the pump.

On cylinder 18, due to the fact that one end of this cylinder 18 is attached to the turret 12, the rod is being extended and the oil is now escaping through port M through swing relief valve 23 and follows through hydraulic line 27 to throttle valve 25 and it can readily be seen that at the proper time the cam 23, through the follower, actuates plunger 33 to throttle this escaping oil.

While the invention has been disclosed as restricting the escaping oil, it could be employed to throttle the oil that is supplying power to the cylinder.

As the cam 23 actuates follower 42 through the roll of roller 45, roll of roller 41 compresses plunger 33 and as this is compressed it will be noted that port 39 has been closed off by member 37, so now oil that is escaping through port M must travel through port 40 in order to return through port B to the control valve.

Since port 40 is shown as being smaller than port 39 which was open when the valve was not actuated, it can readily be seen that the flow of oil has been throttled and the speed of swing of the implement has been slowed down the desired amount.

While the valve is shown with only two ports 39 and 40, it will be understood that any number of ports could be employed in this valve depending on the need.

To actuate the unit in the opposite direction, the operator manually actuates main control valve 29 and supplies fluid pressure to port B in the reverse direction.

It will be seen that oil can flow through actuated valve 25 in two ways, through duct or passage 38 out of port 39 through port J into cylinder 18 and it can compress spring 36 and move member 37 from its seat and flow in that direction also into line 27.

While the cam and follower have been shown for actuating the throttling or restricting valves, it is pointed out that this actuation could be effected by direct contact with the turret, through a toggle means, through a linkage means, by a small hydraulic cylinder actuator, or through electrical means or other suitable arrangements.

From the foregoing it will be seen that I have provided new and improved means for obtaining all of the objects and advantages of the invention.

I claim:
1. In a backhoe adapted to be mounted on a vehicle and including
   a turret pivotally mounted on a support member, a boom pivotally carried by said turret, a dipper stick pivotally connected to the boom, a bucket pivotally connected to said dipper stick, and hydraulic means for controllably pivoting said turret, said boom, said dipper stick and said bucket;
the improvement comprising
   a throttling valve in a hydraulic control line of said hydraulic means for said turret and having
      (1) a first, closable passageway for the flow of hydraulic fluid and (2) a second, permanently open passageway for the flow of said hydraulic fluid,
   and means responsive to the movement of said turret for closing the first passageway of said throttling valve and restricting the flow of said hydraulic fluid to said second passageway.

2. In a backhoe as defined in claim 1, the improvement wherein
   said second, permanently open passageway is smaller than said first, closable passageway.

3. In a backhoe as defined in claim 2, the improvement wherein the closing means comprises
   a cam on said turret,
   and a follower for said cam pivotally mounted on said support and in operating contact with said throttling valve.

4. In a backhoe as defined in claim 3, the improvement wherein
   the cam on said turret is contoured to produce a dwell in the operation of said throttling valve at a prescribed rotational position of said turret.

5. In a backhoe as defined in claim 3 wherein said hydraulic means includes two separate control lines one for each direction of rotation of said turret, the improvement wherein
   said throttling valve is in one of said control lines, another throttling valve is in the other of said control lines,
   and the closing means is disposed for operating either of the throttling valves according to the direction of rotation of said turret.

6. In a backhoe as defined in claim 3, the improvement wherein said throttling valve comprises
   a housing having a longitudinal bore therein and a side aperture, said housing being connected in said control line between said aperture and one end of said bore,
   a spring loaded plunger slidably disposed in said bore with respect to the other end thereof, the inserted end of said plunger having a longitudinal channel with axially displaced side ports therefor, one of said side ports forming, with said channel and said side aperture, said permanently open passageway and other of said ports forming with said channel and said side aperture, said closable passageway.

7. In a backhoe adapted to be mounted on a vehicle and including
   a turret pivotally mounted on a support member, a boom pivotally carried by said turret, a dipper stick pivotally connected to the boom, a bucket pivotally connected to said dipper stick, and
   hydraulic means for controllably pivoting said turret, said boom, said dipper stick and said bucket;
the improvement comprising
   a throttling valve in a hydraulic control line of said hydraulic means for said dipper stick and having
      (1) a first, closable passageway for the flow of hydraulic fluid and (2) a second, permanently open passageway for the flow of said hydraulic fluid
   and means responsive to the movement of said boom for closing the first passageway of said throttling valve and restricting the flow of said hydraulic fluid to said second passageway.

8. In a backhoe as defined in claim 7, the improvement wherein
   said second, permanently open passageway is smaller than said first, closable passageway.

9. In a backhoe as defined in claim 8, the improvement wherein the closing means comprises
   a cam on said boom,
   and a follower for said cam pivotally mounted on said turret and in operating contact with said throttling valve.

10. In a backhoe as defined in claim 9, the improvement wherein
   the cam on said boom is contoured to produce a dwell in the operation of said throttling valve at a prescribed rotational position of said boom.

References Cited

UNITED STATES PATENTS

| | | | |
|---|---|---|---|
| 2,517,153 | 8/1950 | Wood. | |
| 2,143,546 | 1/1939 | Day | 298—22 |
| 2,801,013 | 7/1957 | Pilch | 214—138 |
| 2,903,145 | 9/1959 | Brinkel | 214—138 |
| 3,047,171 | 7/1962 | Long | 214—132 X |
| 3,212,659 | 10/1965 | Koch | 214—132 |

HUGO O. SCHULZ, *Primary Examiner.*